United States Patent
Vangala et al.

(10) Patent No.: US 8,958,799 B2
(45) Date of Patent: Feb. 17, 2015

(54) WIRELESS DEVICE BASED INTER RADIO ACCESS TECHNOLOGY HANDOVER INITIATION

(71) Applicant: Apple Inc., Cupertino, CA (US)

(72) Inventors: Sarma V. Vangala, San Jose, CA (US); Samy Khay-Ibbat, San Francisco, CA (US); Si Li, Santa Clara, CA (US); Sreevalsan Vallath, Dublin, CA (US); Swaminathan Balakrishnan, Santa Clara, CA (US); Tahir Shamim, San Jose, CA (US); Tarik Tabet, Los Gatos, CA (US); Wael S. Barakat, San Jose, CA (US); Wanping Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 13/777,454

(22) Filed: Feb. 26, 2013

(65) Prior Publication Data

US 2014/0113630 A1    Apr. 24, 2014

Related U.S. Application Data

(60) Provisional application No. 61/715,509, filed on Oct. 18, 2012.

(51) Int. Cl.
*H04W 36/00* (2009.01)
*H04W 36/26* (2009.01)

(52) U.S. Cl.
CPC .................................... *H04W 36/26* (2013.01)
USPC ........ 455/436; 455/553.1; 370/252; 370/332; 370/331

(58) Field of Classification Search
USPC ................ 455/436, 553.1; 370/252, 332, 331
See application file for complete search history.

(56) References Cited

U.S. PATENT DOCUMENTS

| | | | |
|---|---|---|---|
| 7,480,519 B2 | 1/2009 | Jeong et al. | |
| 2008/0220784 A1 | 9/2008 | Somasundaram et al. | |
| 2009/0042601 A1* | 2/2009 | Wang et al. | 455/553.1 |
| 2009/0046665 A1* | 2/2009 | Robson et al. | 370/332 |
| 2010/0316021 A1* | 12/2010 | Lerzer et al. | 370/331 |
| 2012/0099458 A1* | 4/2012 | Ezaki et al. | 370/252 |
| 2013/0279470 A1* | 10/2013 | Sen et al. | 370/331 |
| 2014/0087734 A1* | 3/2014 | Wang et al. | 455/436 |

FOREIGN PATENT DOCUMENTS

| | | | |
|---|---|---|---|
| WO | 2009/057960 A2 | 5/2009 | |
| WO | 2012/065646 A1 | 5/2012 | |
| WO | 2012/110420 A1 | 8/2012 | |

\* cited by examiner

*Primary Examiner* — David Q Nguyen
(74) *Attorney, Agent, or Firm* — Meyertons, Hood, Kivlin, Kowert & Goetzel, P.C.

(57) ABSTRACT

User Equipment (UE) based forced inter radio access technology (iRAT) handover. A connection to a network may be established via a first cell operating according to a first radio access technology (RAT). It may be determined to initiate a handover of the UE from the first cell to a second cell operating according to a second RAT. An indication may be transmitted to the network to initiate a handover of the UE from the first cell to the second cell. An indication may be received from the network to perform handover of the UE from the first cell to the second cell in response to the indication to initiate the handover. Handover of the UE from the first cell to the second cell may be performed in response to the indication to perform the handover. Handover may include releasing the connection to the network via the first cell and establishing a connection to the network via the second cell.

18 Claims, 4 Drawing Sheets

WIRELESS DEVICE BASED INTER RADIO ACCESS TECHNOLOGY HANDOVER INITIATION

PRIORITY CLAIM

The present application claims benefit of priority to U.S. Provisional Application No. 61/715,509 titled "Wireless Device Based Inter Radio Access Technology Handover Initiation" and filed on Oct. 18, 2012, whose inventors are Sarma V Vangala, Samy Khay-Ibbat, Si Li, Sreevalsan Vallath, Swaminathan Balakrishnan, Tahir Shamim, Tarik Tabet, Wael S Barakat, and Wanping Zhang, which is hereby incorporated by reference in its entirety as though fully and completely set forth herein.

FIELD

The present disclosure relates to the field of wireless communication, and more particularly to a system and method for a wireless user equipment (UE) device to force an inter radio access technology (iRAT) handover.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. For example, while a newer generation cellular technology is being deployed and as users migrate to devices capable of using the newer generation cellular technology, the networks deploying the newer generation cellular technology may continue to provide service according to one or more previous generation cellular technologies. Some wireless devices may accordingly be provided with the ability to communicate using either of the newer generation cellular technology or one or more previous generation cellular technologies, e.g., in order to be able to obtain more widespread service.

It is common in such cases that such wireless devices may be programmed to prefer the newer generation cellular technology when it is available, e.g., since the newer generation cellular technology may be capable of providing faster/more reliable wireless communication and/or otherwise more desirable characteristics. Accordingly, as more wireless devices are deployed which can make use of the newer generation cellular technology, older generation cellular technologies may receive less use. Given this use pattern, it is possible that in some circumstances an older generation cellular technology may provide better performance than the newer generation cellular technology, for example if a cell operating according to the newer generation cellular technology is heavily loaded while a cell operating according to the older generation cellular technology is relatively unloaded.

However, current standards allow only a network-based redirection from a newer generation cellular technology to an older generation cellular technology. The current standards do not provide for a wireless device to initiate a handover to a different technology based on its own performance criteria. This can lead to a wireless device remaining connected to the network via a heavily loaded newer generation cell which actually provides worse performance than an available lightly loaded older generation cell, negatively affecting both user experience (e.g., due to a slow communication link) and battery life (e.g., if the newer generation cellular technology requires higher power and/or if the wireless device needs to be active and consuming battery at a higher rate for a longer period of time because of the slow communication link). Accordingly, improvements in wireless communications would be desirable.

SUMMARY

In light of the foregoing and other concerns, it would be desirable to provide a way for a wireless user equipment (UE) device to initiate or force inter radio access technology (iRAT) handovers. For example, it may be desirable for the UE to monitor certain characteristics of various cells available to the UE, and determine if a cell operating according to a different (e.g., lower/older) radio access technology would provide better performance than a cell to which the UE is currently attached. If so, the UE could provide an indication to the network initiating or forcing a handover of the UE from the current serving cell to a different serving cell which operates according to a different radio access technology.

Embodiments of the disclosure may thus be directed to such a method, to a UE device configured to implement such a method, and/or to a non-transitory computer accessible memory medium storing program instructions executable by a processor to implement such a method. The UE device may include one or more antennas for performing wireless communication. The UE device may also include a processing element configured to implement part or all of the method (e.g., by executing program instructions). In addition, the UE device may include a non-transitory computer accessible memory medium, which may store program instructions executable by the UE.

The actual cell characteristics monitored, technique(s) used by the UE to determine relative (hypothetical or actual) performance of various cells and force the handover may include any of a variety of techniques, such as those described in further detail subsequently herein.

As one example, the UE may be configured to perform data communications using either of LTE or eHRPD. The UE might thus at some point be attached to an LTE cell and be within communicative range of an eHRPD cell, and might monitor characteristics and estimate performance of each cell.

For example, the UE could estimate future performance of the LTE cell by averaging the modulation and coding scheme (MCS) and resource block (RB)/frame allocation (and/or transport block size (TBS)) over a certain period of time. The estimate could also be updated/appended with event based measurement reports generating additional data.

For the eHRPD cell, the UE could determine parameters such as C/I, RxAGC, and Ec/Io. Based on such parameters, the UE could estimate the data rate control (DRC) which it would request/receive for a connection to the eHRPD cell. Samples based on which these parameters may be determined may be collected periodically, and so the estimated data rate which the UE might obtain via the eHRPD cell might similarly be calculated (e.g., averaged) over a certain period of time.

Other factors which may affect performance of the eHRPD and LTE cells may also be considered. For example, factors specific to the UE, such as different power backoff algorithms implemented by the UE in response to federal communications commission (FCC) specific absorption rate (SAR) requirements for eHRPD and LTE, may affect the actual performance of the eHRPD and LTE cells for the UE in a way that might not be accounted for by the network.

Based on the performance estimates of the eHRPD cell and the LTE cell, then the UE might determine that the eHRPD cell would actually provide better performance than the LTE cell. In such a case, the UE might determine to force a handover of the UE from the LTE cell to the eHRPD cell. Note that the performance estimates and/or determination to force a handover may utilize one or more hysteresis inducing factors, e.g., in order to prevent the UE from forcing handover back and forth between the LTE cell and the eHRPD cell in a rapid manner under equal or nearly equal estimated performance of the LTE cell and the eHRPD cell.

Once the UE has determined to force a handover, the UE may provide an indication to the network which initiates (e.g., forces) the handover. As one example, if the network uses the pilot strength of the eHRPD cell and the RSRP/RSRQ of the LTE cell for determining whether or not to initiate a handover of the UE between the cells, the UE may modify one or more of those values reported to the network for the LTE cell and/or the eHRPD cell. Thus, the UE might underreport the RSRP of the LTE cell, which may in turn cause the network to initiate the handover.

In this case, the indication forcing the handover may be a relatively indirect indication, e.g., may force the handover by manipulating the network's known criteria for initiating iRAT handovers. This may be necessary if this is the only manner in which the network is configured to initiate an iRAT handover. However, it is also possible that the UE might provide a more direct indication to initiate the handover (e.g., if the network is configured to accept/respond to such an indication), e.g., by providing a message requesting an iRAT handover of the UE. Other techniques may be used alternatively or in addition.

Thus in general, the UE may utilize its own, potentially device specific, criteria for performance of cells operating according to different RATs, and may initiate an iRAT handover between cells operating according to different RATs if the wireless device determines that a cell operating according to a different RAT would provide better performance than a current serving cell. This may be particularly useful if the serving cell operates according to a higher/newer RAT which has the potential to provide better performance, but due to loading, device characteristics, and/or other factors, the cell operating according to a different RAT would actually provide better performance.

Note that there may be both power (battery) and user experience benefits to be gained from such techniques, among various possible benefits. In particular, if the UE migrates to a cell which provides better throughput even though it may operate according to a lower/older RAT, active data transfers may be completed more quickly, which may both be desirable to the user in terms of device performance itself, and may also conserve battery power by enabling the device to spend less time awake (e.g., in a more power intensive state) to complete the active data transfers. Furthermore, at least in some cases, operating according to a lower/older RAT may require less power than operating according to a higher/newer RAT, in which cases additional power savings may be obtained by such an iRAT handover to a better performing cell operating according to a lower/older RAT.

BRIEF DESCRIPTION OF THE DRAWINGS

A better understanding of the present subject matter can be obtained when the following detailed description of the preferred embodiment is considered in conjunction with the following drawings, in which.

Figure 1:
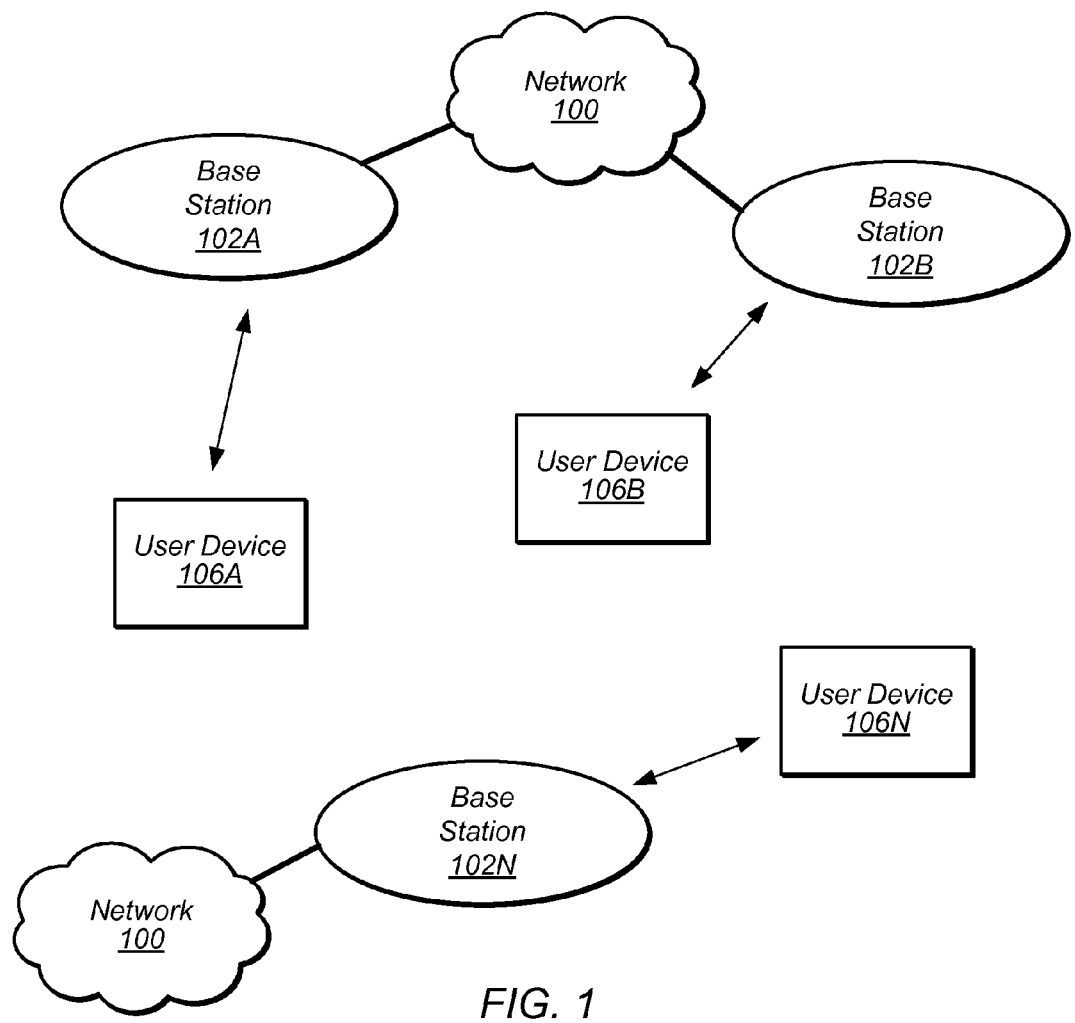
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
LTE-A: LTE-Advanced
eHRPD: Enhanced High Rate Packet Data Terms The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
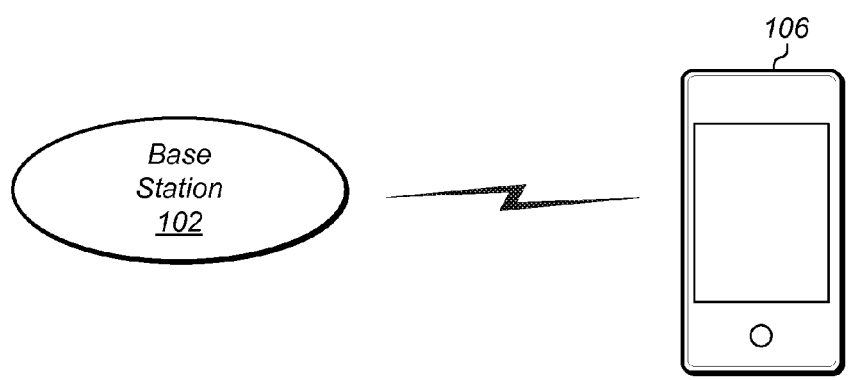
FIG. 2 illustrates an exemplary base station in communication with an exemplary user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A, 102B, etc., through 102N which communicate over a transmission medium with one or more user devices 106A, 106B, etc., through 106N. Each of the user devices may be referred to herein as a "user equipment" (UE). Thus, the user devices are referred to as UEs or UE devices.

The base stations 102A-102N may be base transceiver stations (BTS) or cell sites, and may include hardware that enables wireless communication with the user devices 106A-106N. A base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The base stations 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

Note that a UE 106 may also be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Base stations 102A-102N and other similar base stations operating according to the same or different cellular communication standards may thus be provided as one or more networks of cells, which may provide continuous or nearly continuous overlapping service to UE 106 and similar devices over a wide geographic area via one or more cellular communication standards.

UEs 106A-106N may be capable of communicating with any of base stations 102A-102N, possibly even if some of base stations 102A-102N operate according to different RATs. For example, UE 106A may communicate with base station 102A as its "serving" base station, and may also monitor signals from base stations 102B and 102N (and possibly any other nearby base stations), e.g., to ensure that the UE 106A is being provided with the best possible service. If it were to be determined that base station 102N might provide better service than base station 102A, the UE might perform a "handover" from the cell provided by base station 102A to the cell provided by base station 102N. If base station 102N operates according to a different RAT than base station 102A, the handover may be an inter radio access technology (iRAT) handover.

Note also that if desired, some or all base stations may be capable of operating according to multiple radio access technologies. For example, a base station may be a multi-mode base station configured to operate (e.g., provide service) according to any one of multiple radio access technologies at any given time, or may even be configured to operate according to multiple radio access technologies simultaneously.

FIG. 2 illustrates user equipment 106 (e.g., one of the devices 106A through 106N) in communication with a base station 102 (e.g., one of the base stations 106A through 106N). The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible.

Figure 3:
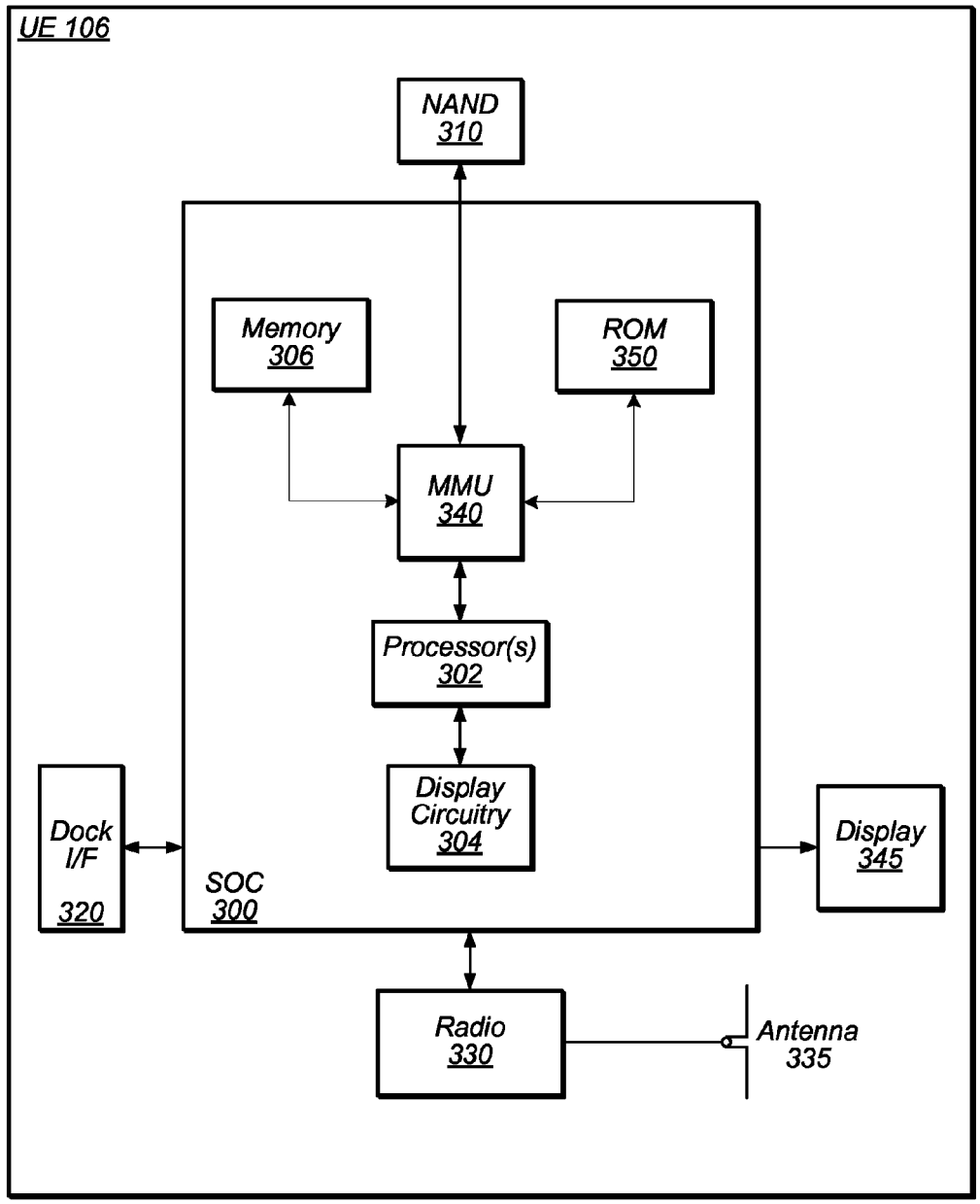
FIG. 3 illustrates an exemplary block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 345, and wireless communication circuitry 330 (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include and/or be configured for use with one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The UE 106 may be configured to support UE based forced iRAT handovers. In particular, as described further subsequently herein, the UE 106 may include hardware and software components for implementing part or all of a method for forcing an iRAT handover.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
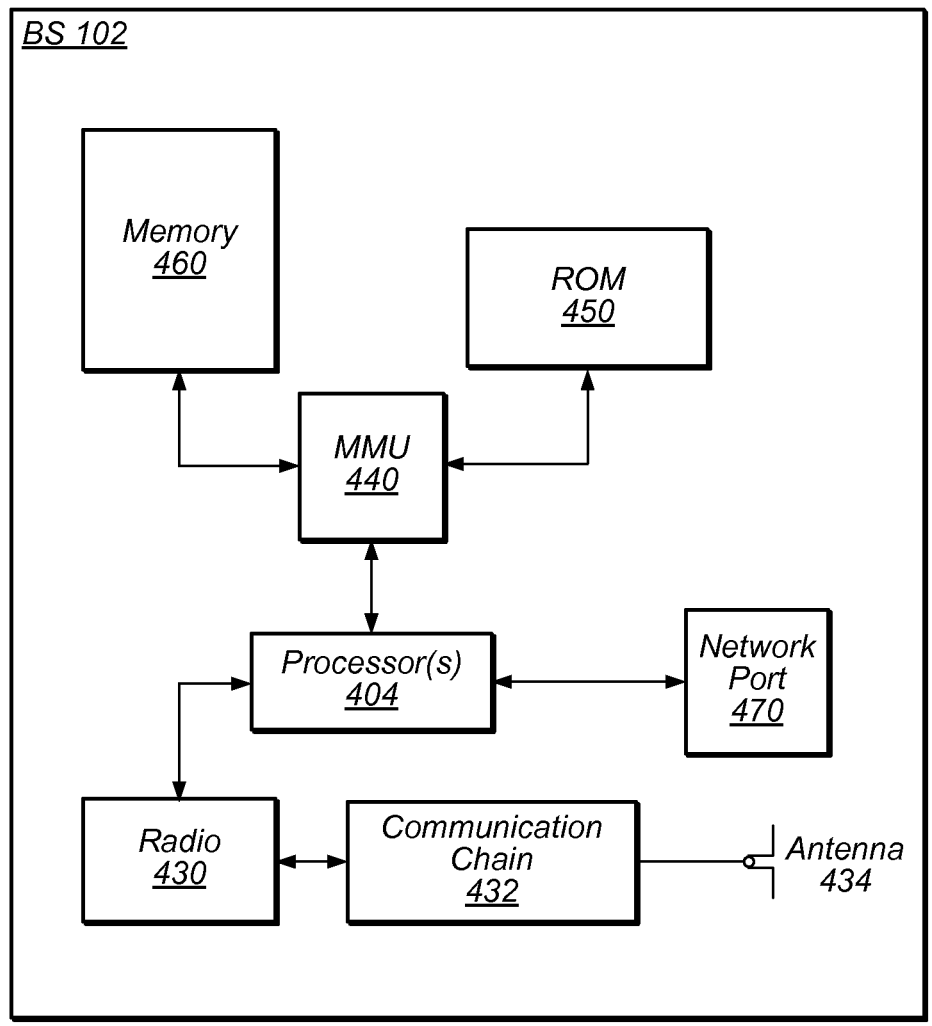
FIG. 4 illustrates an exemplary block diagram of a base station.

FIG. 4—Exemplary Block Diagram of a Base Station

FIG. 4 illustrates an exemplary block diagram of a base station (BS) 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 102 may be configured to support iRAT handovers of user equipment devices 106. In particular, as described further subsequently herein, the BS 102 may include hardware and software components for implementing (or for use in conjunction with a UE 106 implementing) part or all of a method for a UE to force an iRAT handover.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

As previously noted, it may be possible for a user equipment (UE) device 106 to communicate using multiple wireless communication protocols. If access to a cellular service provider's network is available to the UE 106 via multiple radio access technologies (RATs), it may be necessary to decide which RAT to use at any given time. For example, there might be cells available that operate according to different RATs, and the UE 106 (or the network, on behalf of the UE 106) may determine to which of the cells the UE 106 should attach at any given time.

The different RATs may have different characteristics. For example, the different RATs may belong to different generations of technologies, and may have significantly different theoretical capabilities with respect to one or more of throughput, latency, operating range, stability/resiliency, and/or any of various other characteristics. In addition, the actual capabilities of the different RATs may differ in different situations, e.g., depending on the distance, transmission strength, and presence or absence of any line-of-sight obstacles between base stations operating according to various RATs and the UE 106. Furthermore, the UE 106 may have certain characteristics which may affect its operation according to the different RATs in different ways.

Figure 5:
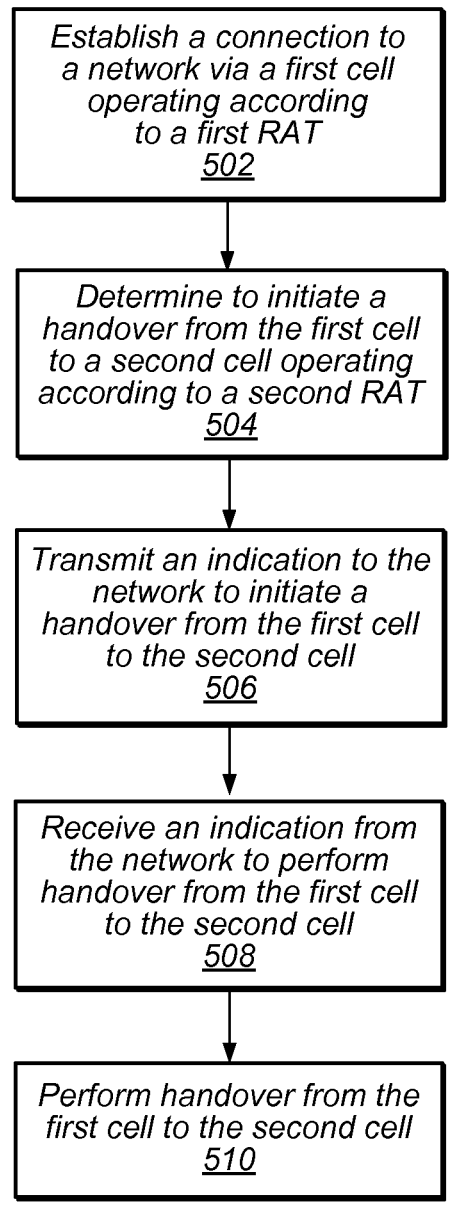
FIG. 5 is a flowchart diagram illustrating an exemplary method for initiating an inter radio access technology handover in a user equipment device.

Accordingly, it may be desirable to provide a way for a UE 106 to determine whether or not to induce an iRAT handover of the UE 106 from a cell operating according to one RAT to a cell operating according to a different RAT, and to force/initiate such an iRAT handover if it determines to do so. FIG. 5 is a flowchart diagram illustrating such a method for a UE 106 to initiate an iRAT handover.

The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired.

Note that the method may be particularly helpful in some implementations in which the standards governing the RATs in question rely on network-based redirection between cells operating according to different RATs. For example, some cellular networks can provide UEs with data connections via either LTE (e.g., a $4^{th}$ generation cellular technology) or eHRPD (e.g., a $3^{rd}$ generation cellular technology), e.g., via an iRAT tunnel. These networks typically control if and when a UE 106 will be redirected (handed over to) an eHRPD cell (e.g., a 3GPP2 CDMA 2000 cell capable of operating according to eHRPD) from an LTE cell or vice versa. Furthermore, these networks typically rely primarily or exclusively on signal strength measurements of the various available cells to determine whether or not to initiate an iRAT handover, without providing a way for UEs to implement their own specific performance criteria. For a UE 106 operating in conjunction with such a network, implementing the method of FIG. 5 may enable that UE 106 to force the network to redirect it to an iRAT cell which it has determined will perform better than its current serving cell based on its own (e.g., device specific) performance criteria. The method may be performed as follows.

In 502, a connection to a network may be established via a first cell operating according to a first RAT. For example, the UE 106 may attach to/form a wireless link with the first cell according to the first RAT, and the first cell may thus communicatively couple the UE 106 to the network, e.g., via a first base station which provides the first cell. The connection may be an idle-mode or a connected-mode connection. The first RAT may be any of a variety of RATs. As one example, the first RAT may be LTE.

In 504, it may be determined to initiate a handover from the first cell to a second cell operating according to a second RAT. The second cell may be provided by a second base station, and may also be capable of providing a communicative coupling between the UE and the network. The second RAT may also be any of a variety of RATs. As one example, the second RAT may be eHRPD or another RAT in the 3GPP2 CDMA 2000 family. For example, the second base station may operate according to the CDMA 2000 family of cellular communication technologies, and may be accessible to the UE 106 according to eHRPD via an iRAT tunnel.

The UE 106 may determine to initiate a handover from the first cell to the second cell in any of a variety of ways. Generally, the UE 106 may determine that the second cell would provide the UE with better performance than the first cell. The UE 106 may be configured to define "better performance" in any of a variety of ways. For example, the UE 106 may monitor and consider various characteristics of the first cell and the second cell in light of their operation according to the first RAT and the second RAT, and various characteristics of the UE 106 itself (e.g., with respect to its operation according to either of the first RAT or the second RAT), and may determine based on those characteristics that the second cell would provide a connection with preferred properties with respect to one or more parameters ("performance criteria", possibly including a combination of multiple parameters), such as expected data throughput, power usage, time to complete active transfers, signal strength and/or quality trends, and/or any of various other parameters. Thus, the UE 106 may have certain criteria for initiating a handover from the first cell to the second cell, and may determine to initiate a handover from the first cell to the second cell if those criteria are met.

Note that the UE 106 may implement one or more hysteresis inducing factors in determining whether or not to initiate a handover from the first cell to the second cell. For example, the UE 106 may bias a comparison of the estimated/expected performance of cells in favor of the serving cell of the UE 106 (e.g., biasing a comparison of the first cell and the second cell in favor of the first cell, based on the first cell acting as a serving cell to the UE 106), in order to avoid forcing handovers back and forth between cells in conditions in which performance of the cells is determined to be equal or nearly equal.

As an example, consider a scenario in which the first cell operates according to a 3GPP RAT (e.g., LTE or LTE-A) and the second cell operates according to a 3GPP2 RAT (e.g., CDMA 2000, potentially including eHRPD). The UE 106 may be capable of determining (estimating) an expected downlink throughput rate of the first cell based on one or more previous downlink throughput rates (e.g., allocated modulation and coding schemes (MCSs), resource block (RB)/frame sizes, and/or transport block sizes (TBSs). For example, the UE 106 might average such information over a period of time (e.g., 200 ms, 300 ms, 400 ms, or any other amount of time, which may be dynamically or statically selected). Ongoing events and/or new measurements which provide additional data could be appended to or used to modify the expected downlink throughput rate, or the expected downlink throughput rate could be recalculated occasionally (e.g., based on newly available information), as desired. The hysteresis inducing factor might include an additional value/bonus added to the expected downlink throughput rate of the current cell (e.g., which may account for or be provided in addition to the potential additional data which might be transmitted in the time interval which would be required to perform handover to a different cell), and/or might include a timer (e.g., initiated after a handover) which forces a waiting period before forcing a handover regardless of estimated performance, and/or might include any of various other possible hysteresis inducing factors.

The UE 106 may also be capable of determining (estimating) an expected downlink throughput rate of the second cell. For example, a high data rate (HDR) stack executing on the UE 106 may occasionally (e.g., periodically, according to predetermined gap intervals) perform and process measurements taken on the second cell, and may thereby gather parameters of the 3GPP2 cell such as C/I, receive-side automatic gain control (RxAGC), and Ec/Io. In particular, C/I may be a direct representation of the SINR seen by the UE 106, which may in turn have a one-to-one mapping to the data rate which the UE 106 would request/receive (e.g., via the data rate control (DRC)) if connected to the network via the 3GPP2 RAT. Accordingly, the UE 106 may be able to calculate (estimate) an expected downlink throughput rate of the second cell based on one or more previous signal quality measurements of the second cell. For example, the UE 106 might average such information over a period of time (e.g., 200 ms, 300 ms, 400 ms, or any other amount of time, which may be dynamically or statically selected, in a similar or different manner than with respect to the first cell). Again if desired, new measurements which provide additional data could be appended to or used to modify the expected downlink throughput rate, or the expected downlink throughput rate could be recalculated occasionally (e.g., based on newly available information).

Thus, as one possibility, the UE 106 may estimate and compare performance estimates of the first and second cell (e.g., of wireless links with the first and second cells) based on expected downlink throughput rate. The estimated expected downlink throughput rates may be compared directly (as potentially modified by any hysteresis inducing factors), or alternatively may be used to calculate another (e.g., related) performance criteria, such as an expected time to complete active transfers. For example, if only a small amount of data remains to be transferred, even a significant difference between expected downlink throughput rates of the first and cell may not be sufficient to warrant a handover to the second cell, e.g., if the transfer would be complete or nearly complete within the time required to perform the handover. In contrast, if a significant amount of data remains to be transferred, even a small difference between expected downlink throughput rates of the first and cell may be sufficient to warrant a handover to the second cell, e.g., if the expected time to complete the transfer would be less via the second cell even considering the time required to perform the handover. Note that expected downlink throughput rate and expected time to complete active transfers are just two of numerous possible performance criteria which may be used by the UE 106 to determine whether or not to force a handover of the UE 106 from the first cell to the second cell.

Note also that device specific considerations with respect to the first RAT and the second RAT may also be considered in determining whether or not to force a handover of the UE from the first cell to the second cell. For example, consider the case of an uplink data transfer. The UE 106 may need to comply with specific absorption rate (SAR) set by the federal communication commission (FCC). However, based on the radiated energy of the cellular antenna, different power back-off algorithms may be applied to meet the SAR exposure requirements. The power backoff can happen on both primary and secondary antennas. As one example, a nominal transmit power limit of 24 dB might be placed on the UE 106 based on the FCC SAR requirements, but due to specific hardware and/or software architecture characteristics of the UE, internal limits on transmit power might be lower and/or different for operation according to 3GPP and 3GPP2 RATs (and/or different 3GPP RATs or different 3GPP2 RATs). In such cases, a hysteresis-based maximum tolerable path loss (MTPL) algorithm may be used, e.g., in addition to uplink throughput rate estimation(s) similar as described above with respect to downlink data transfers, as part of the decision process for determining whether or not to force a handover of the UE 106 from the first cell to the second cell. Other device characteristics may also be considered in addition to or instead of SAR requirement considerations for the UE 106 with respect to various RATs.

Thus the UE 106 may determine to initiate or force a handover from the first cell to the second cell in any of a variety of ways and based on any of a variety of considerations. Once the UE 106 has determined to do so, in 506 an indication may be transmitted to the network to initiate a handover from the first cell to the second cell. The indication may be transmitted to the network via the first cell.

The indication may take any of a variety of forms. For example, if the network is configured to recognize and respond to a message directly commanding or requesting a handover of the UE 106 from the first cell to the second cell, the indication may be such a direct request. However, if the network is configured to control iRAT handovers based on specific parameters (e.g., which may be measured and reported to the network by the UE 106) without provision for a direct iRAT handover request, as for example many networks which implement LTE/eHRPD may be, such a direct request may not be an option. In such a case, a more indirect indication may be appropriate. For example, if the UE 106 knows what criteria which will cause the network to initiate an iRAT handover to the second cell, the UE 106 may modify its reports on characteristics of the first cell and/or the second cell in order to indicate that the network's criteria for an iRAT handover are met.

As one example, some networks may use signal strength characteristics of the first cell and the second cell as the basis for determining whether or not an iRAT handover from the first cell to the second cell would be appropriate. For a cell operating according to LTE, this might include the reference signal received power (RSRP) of the cell. For a cell operating according to eHRPD, this might include the pilot signal strength of the cell. Thus if the first cell operates according to LTE, the UE 106 might underreport the RSRP value of the first cell (e.g., report a lower RSRP value than observed by the UE 106) to the network, such that the network's criteria for initiating a handover are met. Another possibility, in addition to or as an alternative to modifying the RSRP value of the first cell, might include reporting a greater path loss to the network than actually observed by the UE 106.

Alternative types of indication are also possible. In general, although the specific criteria used by the UE 106 and the network respectively to determine whether or not an iRAT handover would be appropriate, it may be the case that if the network is known to initiate handover between cells operating according to different RATs based on certain criteria, the UE 106 may transmit an indication to the network that those criteria are met (e.g., regardless of whether they are in fact met) based on determining that its own (e.g., device specific and possibly different than the network's) performance criteria for initiating handover between cells operating according to different RATs are met.

Based on the indication from the UE 106, the network may determine to perform handover of the UE 106 from the first cell to the second cell. Accordingly, in 508, the UE 106 may receive an indication from the network to perform handover from the first cell to the second cell. This indication may serve as a "go-ahead" type of message, e.g., a confirmation that the UE 106 should perform handover from the first cell to the second cell. This indication may take any of a variety of forms. As one example (e.g., continuing with the LTE/eHRPD example), the indication may include a "redirectionInformationMessage", and may identify the second cell to the UE 106 as the cell to which the UE 106 is being handed over/redirected.

In 510, based on the indication from the network to perform handover, the UE 106 may perform handover from the first cell to the second cell. This may include releasing the UE's connection to the first cell and attaching to the second cell, e.g., according to the second RAT.

Once the UE 106 has performed handover to the second cell, the UE 106 may be communicatively coupled to the network via the second cell. The UE 106 may then be able to complete any active data transfers (e.g., uplink and/or downlink data transfers) using the connection to the network via the second cell, which may operate according to the second RAT.

Since the UE 106 may have determined that the performance of the connection to the network via the second cell is expected to be better than the performance of the connection to the network via the first cell, any such active data transfers may be completed more rapidly using the connection to the network via the second cell than they would have otherwise. In addition to the direct benefit to user experience of a faster (and/or otherwise superior) connection to the network, the UE 106 may thus also conserve power, since less time overall may be required in an active state. Furthermore, if the second RAT generally requires less power according to which to operate than the first RAT (e.g., as may be the case if the second RAT is an older/lower RAT than the first RAT, such as if the first RAT is LTE and the second RAT is eHRPD), the power savings realized by the UE 106 may be compounded by the fact that operating according to the second RAT may require less power per amount of time in an active state than operating according to the first RAT.

Note also that in many scenarios, in addition to the first cell and the second cell, a UE 106 may also monitor one or more other cells (which may operate according to the first RAT, the second RAT, and/or a different RAT) according to its device-specific performance criteria. Thus, although the exemplary method of FIG. 5 primarily relates to a comparison of and forced iRAT handover from a first cell to a second cell, it should be recognized that similar performance comparisons may be made (e.g., in similar and/or subsequent timeframes) for any number of other (e.g., neighboring) cells. If any such comparisons should (e.g., alternatively or subsequently) lead to a determination to initiate an iRAT handover to a different/new cell, similar steps as performed with respect to the first cell and the second cell in the method of FIG. 5 may be performed as the UE 106 forces an iRAT handover to the new cell.

As noted above, the method of FIG. 5 may be particularly relevant in situations in which UEs 106 are generally programmed or directed by the network to prefer a newer generation technology, such that cells operating according to the newer generation technology may often be heavily loaded (e.g., may serve relatively many UEs 106) and may accordingly experience degraded performance relative to their peak potential, while cells operating according to an older generation technology coexisting with the newer generation technology cells may be lightly loaded (e.g., may serve relatively few UEs 106) and may thus be able to provide service at or near their peak potential performance. In such a situation, the near-peak performance achieved by the older generation technology cells may exceed the degraded performance provided by the newer generation technology cells, such that in actual practice the older generation technology cells may provide superior performance. The method of FIG. 5 may advantageously enable a UE 106 to recognize such situations (e.g., by monitoring characteristics, such as C/I and MCS/RB allocations, that take into account the wireless link degrading effects of heavy cell loading, such as increased interference) and force an iRAT handover to a lightly loaded cell of a lower RAT, which may be particularly useful if the network is not configured to recognize such situations and would otherwise keep the UE 106 attached to a heavily loaded higher RAT cell.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, the UE comprising:
a radio, comprising one or more antennas for performing cellular communication;
a memory medium; and
one or more processing elements operatively coupled to the radio and configured to execute program instructions comprised on the memory medium;
wherein the UE is configured to:
attach to a first cell, wherein the first cell is coupled to a network;
monitor performance criteria of the first cell and of a second cell, wherein the second cell operates according to a different wireless communication technology than the first cell, wherein the second cell is also coupled to the network, wherein the performance criteria of the first cell and the second cell comprise at least one of estimated uplink and downlink data rates of connections to the network via the first cell and the second cell,
wherein the network has first criteria for initiating handover from the first cell to the second cell, wherein the UE has second criteria for initiating handover from the first cell to the second cell, wherein the second criteria are different than the first criteria;
determine that the second criteria are met;
transmit information to the network indicating that the first criteria are met based on determining that the second criteria are met, wherein handover of the UE from the first cell to the second cell is initiated by the network based on the information indicating that the first criteria are met, wherein after handover the UE is attached to the second cell.

2. The UE of claim 1,
wherein the performance criteria of the first cell and the second cell are based on one or more of:
one or more signal strength characteristics of the first cell and the second cell;
one or more signal quality characteristics of the first cell and the second cell;
one or more characteristics of the UE.

3. The UE of claim 1,
wherein the first criteria for initiating handover are based on signal strengths of the first cell and the second cell;
wherein the information indicating that the first criteria are met indicates signal strength information for the first cell and the second cell, wherein the signal strength for the first cell and the second cell information is modified to meet the first criteria based on determining that the second criteria are met.

4. The UE of claim 1,
wherein the first cell operates according to LTE, wherein the performance criteria of the first cell comprise an observed data throughput rate averaged over a first period of time;
wherein the second cell operates according to eHRPD, wherein the performance criteria of the second cell comprise an estimated data throughput rate based on observed signal to interference plus noise ratio (SINR) of the second cell averaged over a second period of time.

5. The UE of claim 4,
wherein the performance criteria are also based on transmit power backoff algorithms for the UE according to LTE and eHRPD.

6. A method for a wireless user equipment (UE) device to force handover between cells operating according to different radio access technologies (RATs), the method comprising:
establishing a connection to a network via a wireless link with a first cell operating according to a first RAT;
monitoring characteristics of the first cell and of a second cell operating according to a second RAT;
estimating link performance of the wireless link with the first cell based on monitoring characteristics of the first cell;
estimating link performance of a wireless link with the second cell based on monitoring characteristics of the second cell;
determining to force a handover to the second cell based on estimating link performance of the wireless link with the first cell and estimating link performance of a wireless link with the second cell;
providing modified link characteristic information to the network based on determining to force a handover to the second cell, wherein the modified link characteristic information indicates that the wireless link with the first cell is experiencing greater path loss than observed by the UE, wherein the modified link characteristic information causes the network to initiate handover of the UE from the first cell to the second cell.

7. The method of claim 6, wherein the first RAT is LTE, wherein the second RAT is eHRPD.

8. The method of claim 7,
wherein the modified link characteristic information comprises a reference signal received power (RSRP) report, wherein the RSRP report is modified to indicate a lower RSRP value than observed by the UE.

9. The method of claim 6,
wherein estimating link performance of the wireless link with the first cell comprises estimating an amount of time required to complete active data transfers via the wireless link with the first cell,
wherein estimating link performance of a wireless link with the second cell comprises estimating an amount of time required to complete active data transfers via a wireless link with the second cell, wherein the method further comprises:
determining that the estimated amount of time required to complete active data transfers via a wireless link with the second cell is less than the estimated amount of time required to complete active data transfers via the wireless link with the first cell;

wherein determining to force a handover to the second cell is based on determining that the estimated amount of time required to complete active data transfers via a wireless link with the second cell is less than the estimated amount of time required to complete active data transfers via the wireless link with the first cell.

10. The method of claim 6,
wherein the monitored characteristics of the first cell and of a second cell are indicative of respective loading of the first and second cell.

11. A non-transitory computer accessible memory medium comprising program instructions for initiating an inter radio access technology (iRAT) handover for a wireless user equipment (UE) device, wherein when executed at the UE, the program instructions cause the UE to:
establish a connection to a network via a first cell operating according to a first radio access technology (RAT);
monitor performance criteria of the first cell and of a second cell, wherein the second cell operates according to a second RAT which is different than the first RAT, wherein the second cell is also coupled to the network, wherein the performance criteria of the first cell and the second cell comprise at least one of an estimated uplink data rate and an estimated downlink data rate available via the first cell and the second cell;
determine to initiate a handover of the UE from the first cell to the second cell based at least in part on the performance criteria of the first cell and the second cell;
transmit an indication to the network to initiate a handover of the UE from the first cell to the second cell;
receive an indication to perform handover of the UE from the first cell to the second cell from the network in response to the indication to initiate the handover;
perform handover of the UE from the first cell to the second cell in response to the indication to perform the handover, comprising releasing the connection to the network via the first cell and establishing a connection to the network via the second cell.

12. The memory medium of claim 11, wherein the program instructions further cause the UE to:
determine that performance of a connection to the network via the second cell would be superior to performance of the connection to the network via the first cell with respect to one or more of the monitored performance criteria;
wherein the program instructions cause the UE to determine to initiate a handover of the UE from the first cell to the second cell based on determining that performance of a connection to the network via the second cell would be superior to performance of the connection to the network via the first cell.

13. The memory medium of claim 12, wherein to determine that performance of a connection to the network via the second cell would be superior to performance of the connection to the network via the first cell with respect to one or more performance criteria, the program instructions cause the UE to consider an effect of handover of the UE from the first cell to the second cell on performance of a connection to the network via the second cell.

14. The memory medium of claim 11,
wherein the network is configured to initiate handover of the UE from cells operating according to the first RAT to cells operating according to the second RAT based on signal strength indicators of cells operating according to the first RAT to cells operating according to the second RAT;
wherein the indication to the network to initiate a handover comprises an indication of signal strength of the first cell and of the second cell, wherein the indication of signal strength of the first cell and of the second cell comprises modified signal strength values for one or more of the first cell or the second cell in order to indicate to the network to initiate handover based on determining to initiate a handover of the UE from the first cell to the second cell.

15. A method for a wireless user equipment (UE) device to force an inter radio access technology (iRAT) handover, the method comprising:
establishing a connection to a first cell operating according to 3GPP LTE;
performing signal strength and signal quality measurements of the first cell and a second cell operating according to 3GPP2 CDMA 2000, wherein the first cell and the second cell are operated by a first network operator, wherein the first network operator controls iRAT handovers of the UE based on signal strength characteristics of cells operating according to LTE and CDMA 2000;
estimating expected performance of the connection to the first cell;
estimating expected performance of a connection to the second cell;
comparing the estimated expected performance of the connection to the first cell and the estimated expected performance of a connection to the second cell, wherein the comparison indicates that a connection to the second cell would provide improved performance relative to the connection to the first cell;
determining to force handover to the second cell based on the comparison;
providing signal strength information for the first cell and the second cell to the first network operator, wherein the signal strength information for the first cell is modified by the UE to underreport signal strength of the first cell based on determining to force handover to the second cell;
receiving an indication to perform an iRAT handover to the second cell from the first network operator, wherein the indication is generated by the first network operator based on the signal strength information;
performing an iRAT handover to the second cell based on the indication.

16. The method of claim 15,
wherein estimating expected performance of the connection to the first cell and of a connection to the second cell comprises estimating an expected amount of time required to complete active transfers using the connection to the first cell versus using a connection to the second cell.

17. The method of claim 15,
wherein estimating expected performance of the connection to the first cell and of a connection to the second cell comprises estimating an expected downlink and/or uplink throughput using the connection to the first cell versus using a connection to the second cell.

18. The method of claim 15, wherein comparing the estimated expected performance of the connection to the first cell and the estimated expected performance of a connection to the second cell utilizes a hysteresis inducing factor to bias the comparison towards the first cell based on the first cell acting as a serving cell to the UE.

* * * * *